Dec. 18, 1951  E. B. ANDERSON  2,579,356
CONSTANT VELOCITY JOINT
Filed March 1, 1947  2 SHEETS—SHEET 1

Inventor:
Edmund B. Anderson

Dec. 18, 1951 E. B. ANDERSON 2,579,356
CONSTANT VELOCITY JOINT
Filed March 1, 1947 2 SHEETS—SHEET 2

Inventor:
Edmund B. Anderson

Patented Dec. 18, 1951

2,579,356

UNITED STATES PATENT OFFICE 2,579,356

CONSTANT VELOCITY JOINT

Edmund B. Anderson, Rockford, Ill., assignor to Borg-Warner Corporation, Chicago, Ill., a corporation of Illinois Application March 1, 1947, Serial No. 731,776

3 Claims. (Cl. 64—21)

The present invention relates to universal joints of the type in which torque is transmitted from a driving member to a driven member through the medium of torque-transmitting elements, such as bearing balls, drivingly engaged in raceways formed in the respective driving and driven members and adapted to have their movements controlled by piloting means, such as a ball cage or retainer, to operate in a plane constantly bisecting the angle between the axes of the driving and driven members in each position of relative adjustment thereof so that the speed of rotation of the members always remains the same to provide a constant velocity ratio of torque transmission.

Constant velocity joints of the type indicated above and heretofore devised have comprised outer and inner driving and driven members coupled to each other by a series of torque-transmitting balls engaging registering meridian grooves or raceways in the adjacent spherical faces of said members. To obtain the desired constant velocity ratio of torque transmission by controlling the movement of the balls so that they will operate in a plane bisecting the angle between the axes of the driving and driven members in each position of relative adjustment thereof, one type of velocity joint is constructed to confine the balls in the raceways by a cage received between the driving and driven members and having spherical faces in complementary engagement with similar surfaces of said members concentric to the pivot point around which the joint is angularly adjusted, the cage confining the balls in the raceways by the formation in the cage of a circumferential series of slots to hold the balls so that when the axes of the driving and driven members are at a considerable angle to each other, the combined effect of the raceways and slots in the cage will adjust the cage to position the balls in a plane bisecting the angle between the members. However, it has been found necessary to control the cage during such action for, when the driving and driven members are adjusted angularly from a position at or near axial alignment, the structure does not function to compel the adjustment of the cage to position the balls to bisect the angle and, as a consequence, a binding action will occur which will resist or prevent the desired angular adjustment of the members and may result in breakage. This is due primarily to the fact that unavoidable inaccuracies in construction such as machining the engaging spherical surfaces of the driving and driven members and the cage to very close tolerances often result in clearances occurring between the surfaces of the same changing the structure from that of a true geometrical construction.

Various constructions have been devised to insure the positive adjustment of the cage to the mid-position whenever there is angular adjustment of the axes of the driving and driven members in relation to each other and in one proposed form, the cage is provided with eccentric spherical surfaces imparting a wedge shape cross-section thereto which compels a movement of the balls substantially one-half the relative angular movement of the outer and inner driving and driven members. It will be readily apparent that the formation of the eccentric surfaces on the driving and driven members and cage to secure proper functioning of the same for the purpose described is dependent on the machining of the members with extreme accuracy otherwise binding will result between the members and cage with consequent possible breakage. It has also been proposed to use auxiliary piloting devices utilizing spring-pressed means of various designs to maintain the ball cage in correct position which devices are impractical and unsatisfactory from a commercial standpoint because of the added cost and unreliability as the number of parts of the joint are materially increased and the spring-pressed means must be accurately formed and positioned in the joint to function properly with the cage and associated driving and driven members as a slight imperfection in structure thereof or improper cooperation with those parts of the joint might result in breakage.

A cageless universal joint has also been proposed utilizing a pilot member or retainer to control the movement of the balls to properly centered relationship and which comprises an annular pilot member located between the driving and driven members at one side of the plane of the balls and having complementary engagement with a spherical surface on one member or spherical surfaces on both members other than the directly engaged spherical surfaces of the driving and driven members, the pilot member moving with one or the other of these members and having fingers or prongs extending within the adjacent raceway passages of the members to engage the balls to move the same to a plane bisecting the angle between the axes of the driving and driven members upon angular adjustment of the same.

From the standpoint of economy in manufacture and continuous efficient functioning in operation of this joint, this joint has advantages over the joint utilizing a cage inasmuch as the cage is dispensed with and the spherical surfaces of the torque transmitting members are directly engaged whereby the inevitable inaccuracies of machining the surfaces of the driving and driven members and that of the cage and the lost motion due to inaccurate machining is cut in half with consequent saving and cheapness in mass production as well as less liability of improper functioning of the joint in continuous use over a given length of time. However, in one proposed form, to obtain the desired angular adjustment of the balls, the annular pilot or retainer is provided with spherical surfaces disposed eccentrically with respect to the spherical surfaces of the driving and driven members engaged therewith and to the pivot point of the joint and also the directly engaged spherical surfaces of the driving and driven members are disposed eccentrically to the pivot point of the joint, the eccentricities of all of these surfaces being calculated in accordance with certain geometrical principles to effect movement of the balls to their correct midway position by the retainer in conjunction with the surfaces. The manufacture of this joint is expensive due to the complicated formation of the eccentric surfaces to geometrical correspondence which requires exacting accuracy in machining these surfaces for obtaining correct ball-positioning operation of the pilot member and the driving and driven members and absence of binding action which will resist or prevent the desired angular adjustment.

Another proposed form of constant velocity universal joint utilizing a retainer disposed at one side of the plane of the balls and at one end of the meridian raceways in the driving and driven members contemplates the formation of the engaged spherical surfaces of the driving and driven members and the engaged surfaces of one of the members and the retainer concentrically with the common pivot point of the joint. In this form, to prevent the balls falling out of the opposite end of the raceways, which would occur if the meridian raceways of the driving and driven members were concentric with the pivot point of the joint, the corresponding ball grooves or raceways of the driving and driven members are each arcuate in a direction of its length with the center of its arc offset with respect to the centers of the driving and driven members so that the grooves will form wedging surfaces which resist improper displacement of the balls at the remote ends of the raceways and the rotation of the balls in their midposition is effected. While these desirable results are provided, they are obtained at a very great cost because it is expensive to accurately machine each of the arcuate ball-engaging surfaces of the driving and driven members to a true radius and in a definite relation to the differing radius of the other spherically engaged surfaces of the driving and driven members.

The present invention has for its primary object the provision of a new and improved cageless constant velocity universal joint of the retainer type of relatively simple construction and which may be readily and inexpensively manufactured. To this end, the engaged spherical surfaces of the driving and driven members and also the spherical surfaces of one of these members and the retainer in engagement are all concentric to the pivot point of the joint, and the ball-engaging grooves of the outer and inner members are each bored straight to provide cylindrical surfaces inclined radially and diverging toward the retainer, the angle of radial inclination of the diverging grooves being such as to form an included angle so that the bottom of each of the outside raceways of one of the members and the bottom of each of the opposed inside raceways of the other member never become parallel to allow the balls to roll out at the ends of the raceways remote from the retainer. By thus forming the spherical surfaces of the driving and driven and retainer members concentric with the pivot point of the joint, the construction of the joint is greatly simplified by avoiding the determination of the location of three or more spherical surfaces eccentric with respect to each other according to involved geometrical theory and thereafter maintaining the relative fixed position of the eccentric surfaces during the machining operation which must be extremely accurate to positively and correctly position the balls in their midposition and to prevent binding and breakage during operation of the joint. Furthermore, the ready formation of the raceways by boring the same as described avoids the extensive grinding of arcuate or curved ball-engaging raceways of the driving and driven members to a true radius in which a slight inaccuracy may result in an unequal distribution of the load on the various balls.

Another object of the invention is to provide a joint as described wherein the component parts thereof are readily assembled and disassembled.

Other objects, the advantages and uses of the invention will become more apparent after reading the following specification and claims, and after consideration of the drawings forming a part of the specification, wherein:

Figure 1:
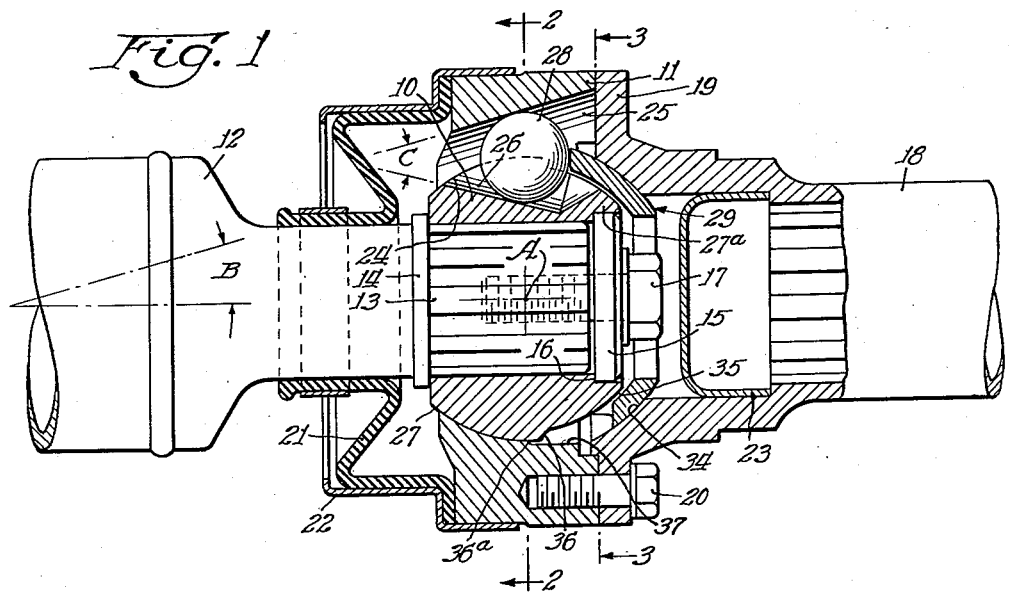
Fig. 1 is an axial sectional view of a universal joint embodying my invention, taken as indicated by the line 1—1 of Fig. 2.

As an example of one form in which the present invention may be embodied, there is shown in the drawings a constant velocity universal joint comprising male and female torque-transmitting elements 10 and 11, respectively, each adapted to be attached to one of a pair of shaft sections to be drivingly connected by the joint. One of said shaft sections is shown at 12 and is provided with a splined end portion 13 on which the male element or ball 10 is secured against relative movement by a flange 14 formed integral with the shaft section 12 and engaging one end of the element 10, a washer 15 engaging an annular shoulder 16 interiorly of the element 10 and cooperating with a bolt 17 threaded into the end of the shaft section 12 to fix the male element 10 on the shaft section. The other shaft section is shown at 18 as being formed at one end with an annular flange 19 to which is secured the female element 11 by means of bolts 20 passing through openings in the flange and into threaded openings in the female element 11. Due to this connection between the female element 11 and flange 19 of the shaft section, they may be considered collectively as a single outer socket torque-transmitting element connected to the shaft section 18. The shaft sections 12 and 18 are provided with means for confining lubricant within the joint such as a flexible boot 21 of any suitable oil-impervious material surrounding the shaft section 12 and being clamped against the adjacent end of the female element 11 by a boot retainer 22, spaced from the shaft section 12 and engaging the element 11 and the boot 21 to prevent lubricant leakage from the joint, a plug 23 being closely fitted within the cylindrical shaft section 18 to prevent the passage of oil or lubricant therethrough.

The female element 11 of the joint has an interior divided into a plurality of spherical zonal surfaces 24 by a plurality of ball raceways 25. The male element 10 has an exterior surface broken up by a plurality of ball raceways 26, opposed to the raceways 25 as shown in Figs. 1 and 2, into a plurality of spherical zonal surfaces 27 in complementary engagement with the spherical zonal surfaces 24 of the element 11 to provide a ball and socket connection accommodating relative angular adjustment of the shaft sections about the pivot point of the joint indicated at A in Figs. 1 and 2, as the spherical zonal surfaces 24 and 27 of the elements 10 and 11 are concentric to the pivot point A of the joint.

Figure 2:
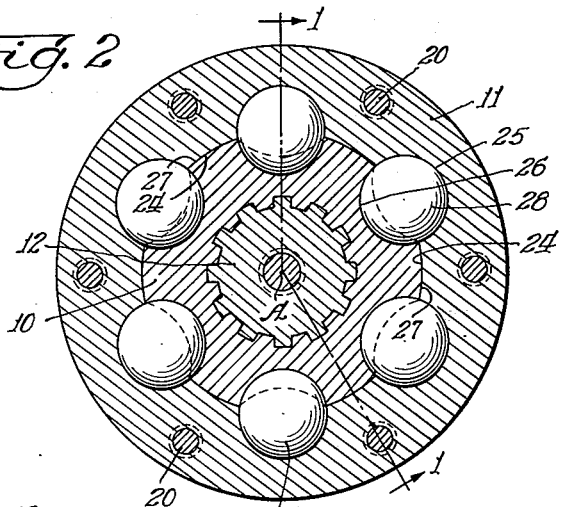
Fig. 2 is a transverse sectional view of the same joint taken as indicated by the line 2—2 of Fig. 1.
Figure 4:
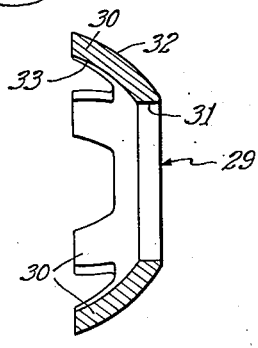
Fig. 4 is a sectional view of the ball retainer.

Each of the raceways 25 are semi-cylindrical and are inclined radially inwardly and toward the aligned axes of the sections 12 and 18 as viewed in Fig. 1, the angle of inclination being indicated at B in Fig. 1. The raceways 26 are also semi-cylindrical but are inclined radially upwardly away from the aligned axes of the shaft sections 12 and 18, i. e., the direction of inclination of the raceways 26 being opposite to that of the opposed raceways 25. The male member 10 is received within the female member 11 with each of its raceways 26 paired with a raceway 25 of the member 11.

As the grooves or raceways 25 and 26 have the same angle of inclination though oppositely inclined with respect to the axes of the driving and driven members, these grooves in the male and female elements may be economically machined by a milling cutter disposed at the required angle to the axis of each of the male and female elements which elements may be readily positioned in a machine movably fixing the cutter at the required angle of inclination to the axis of either of the members which are fixed in the machine but rotatable therein, or vice versa, so that it is possible to finish the ball races of the members 10 and 11 in the same manner using the same machine for both members, the raceways 25 of the male member 10 being bored straight through and the raceways 26 of the male member 10 to an extent determined by the washer-engaging portions 27a of said member. The formation of the ball races in the male and female elements 10 and 11 in this manner by machining the same straight by a milling operation affords a substantial economy over previous joints wherein the ball races were curved.

Within each pair of opposed raceways 25 and 26 are disposed torque-transmitting balls 28. As previously described, the surfaces of the raceways are semi-cylindrical and therefore are semi-circular in cross-section so as to substantially conform to the cross-sectional contour of the torque-transmitting balls, each ball being located partially in a raceway 25 and partially in a raceway 26 so that it may transmit torque between the driven and driving members 11 and 10.

Figure 3:
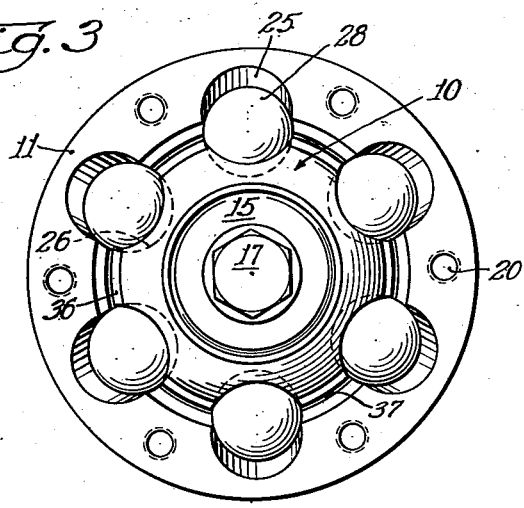
Fig. 3 is a view on line 3—3 of Fig. 1 with ball retainer omitted.

To maintain the balls in position in the joint in a plane bisecting the angle between the axes of the driving and driven shaft sections during each position of relative adjustment thereof, the joint is provided with a ball retainer or pilot member 29 which cooperates with the raceways 25 and 26 for the accomplishment of this feature in the invention. More particularly, the retainer 29 is of disc form and has projecting fingers or prongs 30, each engaging a ball. The retainer is also annular in shape, as clearly shown in Fig. 3 having a central opening 31 into which extends the bolt 17 in spaced relation to the retainer for a purpose which will appear as the description proceeds. The outer surface 32 of the retainer is formed as a portion of a sphere and the inner surface 33 of the retainer is also spherical in form. The spherical surface 32 of the retainer is engaged by a complementary inner surface 34 on the adjacent end of the shaft section 18, the surfaces 32 and 34 being machined concentric to the pivot point A of the joint. As clearly seen in Fig. 1, the spherical surface 33 of the retainer is in spaced relation to a similar surface zone 35 of the adjacent end of the male element 10 which is of smaller radius than the surface zone 27 of the element 10 and, accordingly, is offset therefrom by the extent indicated by the depth of the shoulder 36 on the element 10 dividing the surface zones 27 and 35. It will be apparent that inasmuch as the spherical surface zone 35 is spaced from the adjacent surface 33 of the retainer, these surfaces need not be machined concentric to the pivot point A of the joint with the accuracy required in machining the surface 27 of the element 10 and the surface 32 of the retainer. Also, as the surface 33 of the retainer does not engage the surface zone 24 of the female element 11 but is spaced therefrom the surface zones 24 of the element 11 need only be substantially the area of the surface zones 27 of the male element 10 which permits these surface zones to be formed hemi-spherical and thereby considerably expedites the formation of the engaged spherical surfaces of these elements in the grinding and machining operation of each element by the application of a suitable tool performing these functions along the axis of the element.

The opening in the female element 11, defined on one end by the zonal surfaces 24, extends axially to the point of greatest radius of the surfaces 24, at which shoulders 36a are formed. Beyond the shoulders 36a the opening within the female element 11 is formed by cylindrical walls 37 and the portion of the opening defined by the walls 37 is of larger size than the largest diameter of the male element 10, as clearly shown in Fig. 1.

Describing the operation of the joint, it will be noted that when the shaft sections 12 and 18 are in axial alignment as illustrated in Fig. 1, the balls 28 will be disposed in a plane perpendicular to the axis by the raceways 25 and 26 and the retainer 29 and will transmit torque from one of the shaft sections to the other shaft section through the intermediary of the male and female elements 10 and 11 of the joint by virtue of engagement of the balls with the raceways provided in these elements. It will be apparent that the raceways are parallel with respect to each in their driving plane in these axial aligned positions of the shaft sections and that the retainer 29 will operate to maintain the balls 28 against the bottom of the respective raceways associated therewith.

Figure 5:
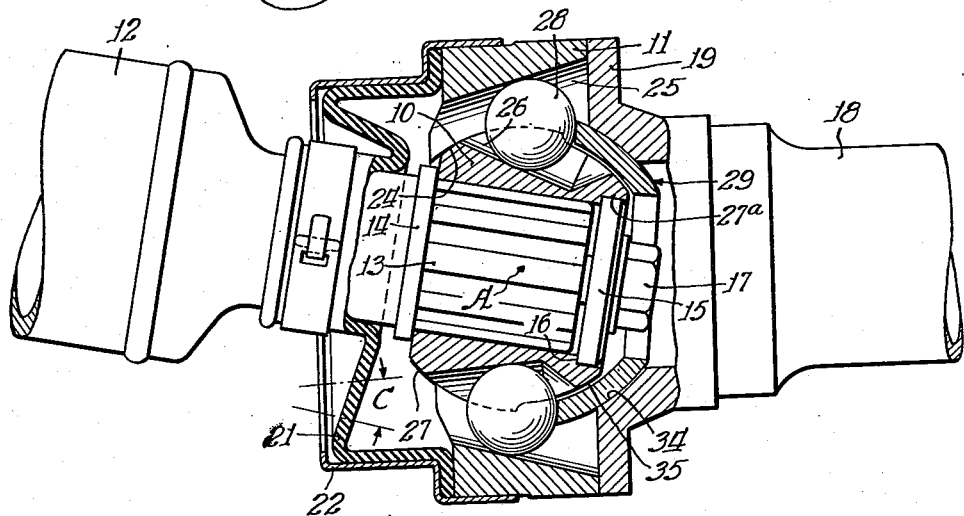
Fig. 5 is a view similar to Fig. 1 with the driving and driven members being shown disposed with their axes at an angle to each other so that the parts of the operating mechanism are in a different operative position.

Upon angular displacement of the shaft section 12 relative to the shaft section 18, certain of said pairs of raceways 25 and 26 at one side of the axis of the joint will have their axes disposed at a greater angle and thereby effect a wedging action on the associated balls to cause the balls to move and rotate the retainer 29 which will urge the balls at the opposite side of the joint against the bottoms of their associated raceways 25 and 26, whose axes are approaching parallelism as will be apparent from an inspection of the normal position of the joint in Fig. 1 to the angular position as shown in Fig. 5. Inasmuch as this action of the wedging surfaces and the retainer 29 on the balls is simultaneous, the balls 28 will always be positioned in a plane bisecting the angle of the axes of the shaft sections 12 and 18 during relative adjustment of the same. It will be apparent that when the joint is operating at an angle, there are only two raceways opposite one another that are parallel or close to parallel, the other raceways becoming crossed by the angle of the joint. These two raceways are sufficient to prevent high thrust loads on the balls with its attendant overheating. With the raceways crossing in two planes, if analyzed, it will be noted that the balls will try to roll in two directions at the same time. However, due to the parallelism of the raceways in their driving plane, it has been proven in actual practice that this action is almost negligible as previously noted, clearance exists between the inside of the retainer 29 and male element 10, the outside of the retainer having bearing engagement with the shaft section 18. However, if desired, the inside of the retainer may have bearing engagement with the ball element 10 and the outside of the retainer may be spaced from the shaft section 18 without affecting the operation of the joint. In either case, the geometry of the crossed raceways in their driving plane is such that they will permit the spherical retainer to function perfectly as a sphere in conjunction with the balls. The joint of the present invention has been subjected to extensive experimental tests which have satisfactorily proven and confirmed the foregoing statements with respect to the operation of the joint.

An important feature incorporated in the joint of the present invention, referring to Figs. 1 and 5, is that the included angle indicated at C formed by the bottoms of each pair of raceways of the outer and inner elements 10 and 11 is great enough to exceed the operating angle of the universal joint so that the bottom of the outside raceway and the bottom of the inside raceway will never become parallel, as this would permit the balls to roll out of the raceways and cause damage to the universal joint assembly. Referring to Fig. 1, the angle C is formed by the oppositely inclined bottoms of the raceways 25 and 26 of one pair of raceways, each pair of raceways 25 and 26 having a similar included angle in this position of the joint wherein the shafts are in axial alignment. Referring to Fig. 5 wherein is illustrated the shaft sections 12 and 18 having their axes angularly adjusted, it will be noted that the pair of raceways 25 and 26 at the bottom of the joint form an included angle C substantially greater than the angle formed by the raceways in the normal position shown in Fig. 1 wherein the shaft sections 12 and 18 are in axial alignment. It will be apparent that the angular disposition of the bottom pair of raceways 25 and 26 indicated by the angle C precludes any possibility of the ball rolling out of the ends of the raceways remote from the retainer and that the retainer 29 cannot possibly force the ball 28 out of the open end of the raceways during angular adjustment of the shaft sections 12 and 18.

The universal joint of the present invention is readily assembled and disassembled inasmuch as, in the assembly operation, the female element 11 may be positioned on the shaft section 12, the male element 10 thereafter being mounted on the splined end of the shaft 12 and secured thereto by the washer 15 and bolt 17. During assembling, before the shaft section 18 has been fixed, by means of bolts 20, to the female element 11, it is clear that the male element 10 may be freely passed into the opening within the female element, due to the fact that the portion of the opening defined by the walls 37 is greater in size than the largest diameter of the male element 10, to bring the hemispherical zonal surfaces 24 and 27 into engaging contact. The balls 28 are then inserted in the paired raceways of the male and female elements 10 and 11 and thereafter the retainer element 29 may be engaged with the balls whereupon the shaft section 18 may have its spherical surface 34 engaged with the surface 32 of the retainer and the flange 19 of the section 18 may be securely fastened to the female element 11 by means of the bolts 20 to complete the assembly of the joint. The lubricant-retaining boot 21, and the plug 23 being assembled in customary manner with the other portions of the joint. It will be apparent that disassembly of the joint may be readily secured by a reversal of the operations necessary to assemble the joint.

From the foregoing description of the invention, it will be apparent that I have provided a universal joint effective, during the operation of the joint, to transmit drive from either shaft to the other by balls adapted to have their movement controlled by piloting means to operate in a plane constantly bisecting the angle between the axes of the driving and driven shafts in each position of relative adjustment thereof so that the speed of rotation of the shafts always remains the same to provide a constant velocity ratio of torque transmission and that I also have provided a universal joint which is inexpensive to manufacture, simple and sturdy in construction, efficient in operation, and which comprises a minimum number of easily assembled parts.

While the structure disclosed herein represents a preferred form and application of the invention, it is to be understood that there are numerous other forms and applications thereof which will be apparent to those skilled in the art and all of which are within the scope of the invention as set forth in the appended claims.

I claim:

1. In a universal joint assembly, in combination, a male torque transmitting element having a hemispherical surface and a female torque transmitting element having an opening therein, the hemispherical surface of said male element terminating at its greatest radius, the opening in said female element being defined on one end by a hemispherical surface and the male element being disposed within said female element with said hemispherical surfaces in engagement, the hemispherical surface of said female element terminating at its greatest radius and the other end of said opening being larger than said male element so that the male element is readily insertable within the female element to engage said hemispherical surfaces in the assembly of said elements, said hemispherical surfaces being provided with a plurality of pairs of registering raceways therein, a ball in each pair of raceways, and means maintaining said elements and balls in assembly.

2. In a universal joint assembly, in combination, a male torque transmitting element having a hemispherical surface and a female torque transmitting element having an opening therein, the hemispherical surface of said male element terminating at its greatest radius, the opening in said female element being defined on one end by a hemispherical surface and the male element being disposed within said female element with said hemispherical surfaces in engagement, the hemispherical surface of said female element terminating at its greatest radius and the other end of said opening in said female element being larger than said male element so that the male element is readily insertable within the female element to engage said hemispherical surfaces in the assembly of said elements, said hemispherical surfaces being provided with a plurality of pairs of registering raceways therein, all of the raceways of each element being radially inclined toward one end of the element and having a radial inclination opposite to that of the raceways of the other element so that the deep ends of the raceways of the two elements are adjacent each other, a ball in each pair of raceways, pilot means for said balls disposed between said elements, having a spherical surface concentric with the pivotal axis of the universal joint and in engagement with a spherical surface of one of said elements, said pilot means extending within said deep ends of said raceways and engaging said balls and cooperating with said raceways to maintain said balls in a plane which always bisects the angle between the axes of said elements during relative angular movement of the rotational axes of said elements, and means maintaining said elements, balls and pilot means in assembly.

3. In a universal joint assembly, in combination, a male torque transmitting element having a hemispherical surface and a female torque transmitting element having an opening therein, the hemispherical surface of said male element terminating at its greatest radius, the opening in said female element being defined on one end by a hemispherical surface and the male element being disposed within said female element with said hemispherical surfaces in engagement, the hemispherical surface of said female element terminating at its greatest radius and the other end of said opening in said female element being larger than said male element so that the male element is readily insertable within the female element to engage said hemispherical surfaces in the assembly of said elements, said hemispherical surfaces being provided with a plurality of pairs of registering raceways therein, all of the raceways of each element being radially inclined toward one end of the element and having a radial inclination opposite to that of the raceways of the other element so that the deep ends of the raceways of the two elements are adjacent each other, a ball in each pair of raceways, pilot means for said balls disposed between said elements having a spherical surface concentric with the pivotal axis of the universal joint, said pilot means extending within said deep ends of said raceways and engaging said balls for cooperating with said raceways to maintain said balls in a plane which always bisects the angle between the axes of said elements during relative angular movement of the rotational axes of said elements, and a shaft member capping the large end of the opening in said female element and having a spherical surface in engagement with the spherical surface on said pilot means thereby maintaining said elements, balls and pilot means in assembly.

EDMUND B. ANDERSON.

REFERENCES CITED

The following references are of record in the file of this patent:

UNITED STATES PATENTS

| Number | Name | Date |
|---|---|---|
| 1,975,758 | Stuber | Oct. 2, 1934 |
| 2,046,584 | Rzeppa | July 7, 1936 |
| 2,319,100 | Anderson | May 11, 1943 |
| 2,321,448 | Anderson | June 8, 1943 |